United States Patent
Lamkin et al.

[11] Patent Number: 5,905,756
[45] Date of Patent: May 18, 1999

[54] BYTE SEQUENCING PROTOCOL FOR AN ASYNCHRONOUS DATA TRANSMISSION SYSTEM

[75] Inventors: Allan Lamkin; Graham Avis, both of San Diego, Calif.; Simha Erlich, Haifa, Israel

[73] Assignee: Hughes Electronics Corporation, El Segundo, Calif.

[21] Appl. No.: 08/767,649

[22] Filed: Dec. 17, 1996

[51] Int. Cl.[6] .................................................. H04J 3/00
[52] U.S. Cl. ..................... 375/222; 375/370; 370/472; 370/474; 370/476; 370/509; 370/522
[58] Field of Search ................................. 375/222, 260, 375/354, 358, 369, 370; 370/300, 470, 474, 476, 496, 509, 510, 522; 395/850

[56] References Cited

U.S. PATENT DOCUMENTS

| | | | |
|---|---|---|---|
| 5,570,356 | 10/1996 | Finney et al. | 370/476 |
| 5,721,733 | 2/1998 | Wang et al. | 370/332 |

*Primary Examiner*—Amanda Le
*Attorney, Agent, or Firm*—John T. Whelan; Michael W. Sales

[57] ABSTRACT

A communication system that communicates between a base station and a mobile station over a wireless rf channel. The communication system uses a novel protocol for transmitting a data frame in which an 8-bit data byte is divided into two 4-bit data nibbles. Each data nibble is assigned a 4-bit sequence number to form a transmission byte. By determining the sequence number of any transmission byte or series of transmission bytes, the beginning and the end of a data frame can be determined. A CRC check indicates when a data frame has been received successfully. The protocol does not require the use of unique start-of-frame (SOF) and end of-frame (EOF) characters. Also, the system implements a majority vote algorithm that collects data from successively transmitted copies of a given data frame and performs a majority vote to determine a mostly likely received data pattern. The protocol allows the system to achieve an improvement analogous to a 1.5 to 2.5 dB increase in signal power over other transmission protocols that require the use of SOF and EOF characters to transmit a data frame.

11 Claims, 3 Drawing Sheets

BYTE SEQUENCING PROTOCOL FOR AN ASYNCHRONOUS DATA TRANSMISSION SYSTEM

BACKGROUND OF THE INVENTION

This invention relates generally to data communications systems and, more particularly, to a digital communication system for transmitting data through a radio frequency (rf) channel that is subject to noise and channel fades.

A wireless rf channel, for use between a mobile station and other mobile stations or a base station, is subject to Rayleigh fading and often gaussian or white noise. An example of such an rf communications channel is a 900 Megahertz (MHz) channel for use in cellular communications.

A 300 baud modem uses asynchronous frequency-shift keying (FSK) to transmit digital data through a communications channel. An asynchronous data communication system typically transmits data in data packets that use a start bit and a stop bit because the exact arrival time of any given data packet is not known. In typical operation of a asynchronous system, a transmitting device holds the communication channel at a predetermined state, for example, one. The channel is then toggled by a start bit, which changes the channel's state (from one to zero). The start bit indicates the beginning of the data packet. The stop bit indicates the end of the data packet and changes the channel back to the wait state. For example, the stop bit toggles the channel data from one to zero and then back to one, if the bit previous to the stop bit was a one, and the stop bit keeps the channel at zero and toggles it to one if the bit previous to the stop bit was a zero.

Data structures having more than one byte of data are sent using protocols that identify the beginning and the end of a data frame using a start-of-frame (SOF) byte and an end-of-frame (EOF) byte, respectively.

SUMMARY OF THE INVENTION

The present invention is embodied in an apparatus, and related method, that sends digital information, such as messages formatted into data bytes, through a noise-prone rf communication channel. The system divides a data byte into data nibbles and attaches a sequence number to each data nibble to form a transmission byte. The transmission byte is transmitted through the channel as a data packet and the original data byte is reconstructed at the system's receiving end.

More particularly, the apparatus provides communication of data bytes between a first station and a second station through an rf data channel that is subject to conditions that can cause byte insertions and deletions. The apparatus includes a first processor and a first rf modem, both associated with the first station, and a second processor and a second rf modem, both likewise associated with the second station. The first processor is associated with the first station. When the first processor has data byte for transmission, the processor divides the data byte into two data nibbles, assigns a unique sequence number to each data nibble, and combines each data nibble with the respective sequence number to form a transmission byte. Accordingly, each data byte is split between at least two transmission bytes. The first rf modem, after receiving transmission bytes from the first processor, transmits the transmission bytes through the rf data channel. The second rf modem receives the transmission bytes from the rf data channel. The second processor then receives the transmission bytes from the second rf modem and, using the sequence numbers, identifies and removes byte insertions and accounts for byte deletions. The second processor reconstructs, if the respective transmission bytes are successfully received, a data byte from the successfully received transmission bytes.

In a more detailed feature of the present invention, the first processor structures the data bytes into at least one data frame. Each data frame has a control byte, message bytes, and one or more check bytes. The receive processor may further perform a CRC check on the received data frame using the check bytes and generate an acknowledgement message for transmission to the first processor if the CRC check results in a match with the check bytes. The second modem transmits the acknowledgement message through the rf channel to the first modem which forwards the acknowledgement message to the first processor. If the first station fails to receive an acknowledgement message from the second station, it repeats transmission of the data frame.

In another more detailed feature of the present invention, the second processor, after reconstructing data bytes for at least three different transmissions of a given data frame for which a CRC check after each data frame transmission has failed to result in a match, performs a byte-by-byte likelihood check using the reconstructed data frames to form a plausible data frame. The second processor repeats the likelihood check, including subsequently transmitted data frames, until the CRC check of the plausible data frame results in a match and an acknowledgement message is sent to the first station. The second processor may further perform a bit-by-bit majority vote on the reconstructed data frames before performing the byte-by-byte likelihood check. Alternatively, the second processor performs the likelihood check by performing a byte-by-byte majority vote.

In other more detailed features of the present invention, each data byte is comprised of 8 bits and each transmission byte is comprised of 8 bits. The 8 bits of the transmission byte are divided with 4 bits for the data nibble and 4 bits for the sequence number. The control byte includes 3 bits defining a frame identification number and 5 bits defining, in bytes, a message length. Also, the check bytes are a 16-bit cyclic redundancy code (CRC) sum. The acknowledgement message has a message length of zero. To identify the first byte of a data frame, the first processor calculates a correlation factor on the sequence numbers.

Another embodiment of the present invention resides in a method for communicating a data frame formed of at least one data byte through a noisy data channel. The data byte is first divided into two or more data nibbles. Each data nibble is then combined with a sequence nibble to form a transmission byte and the transmission byte is transmitted across the data channel. At the other end of the data channel, the beginning of the data frame is located by identifying the sequence nibble. The data nibbles, from the appropriate transmission bytes, are then combined to reconstruct the original data byte. The sequence number allows determination of whether a byte has been deleted or inserted.

BRIEF DESCRIPTION OF THE DRAWINGS

The above and other aspects, features and advantages of the present invention will be more apparent from the following more particular description thereof, presented in conjunction with the following drawings, wherein.

DETAILED DESCRIPTION OF THE INVENTION

The following description is of the best mode presently contemplated for carrying out the invention. This description is not to be taken in a limiting sense, but is made merely for the purpose for describing the general principles of the invention. The scope of the invention should be determined with reference to the claims.

Figure 1:
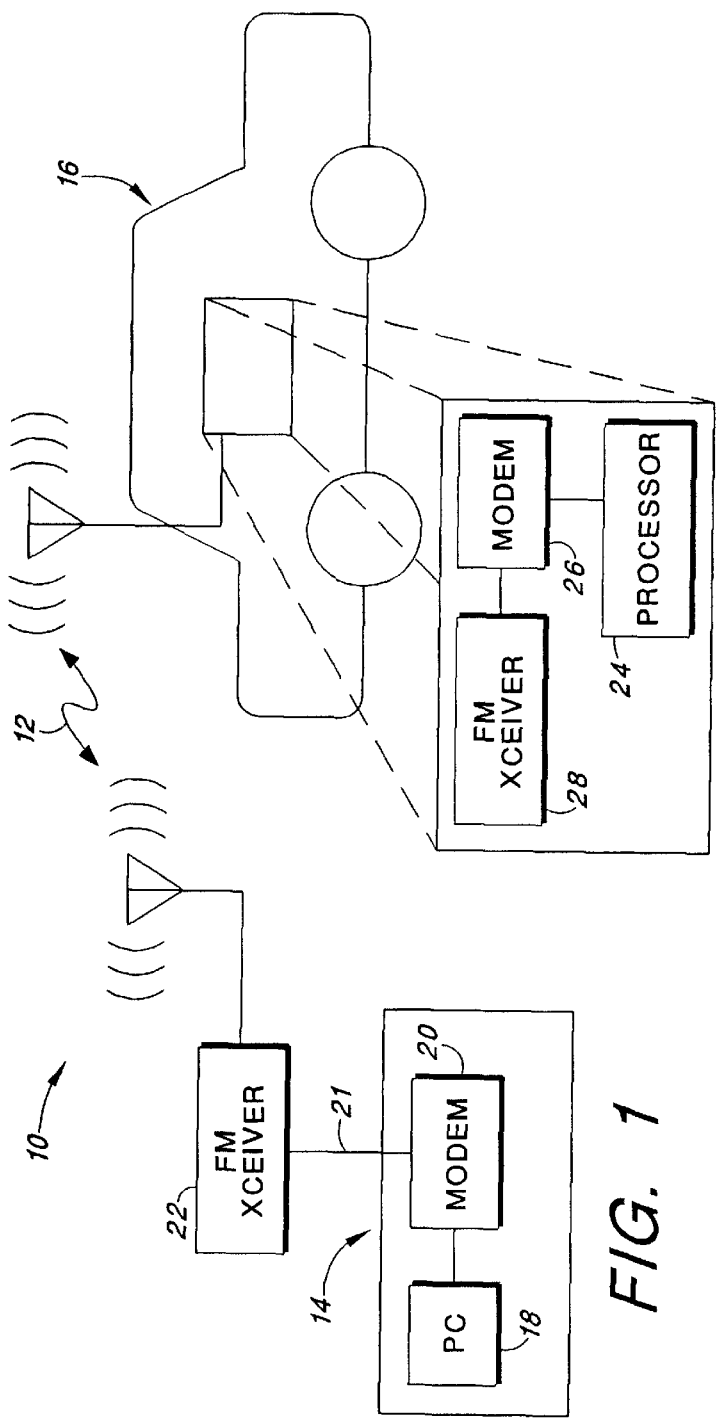
FIG. 1 is a functional block diagram of a communication system having a base station that communicates with a mobile station using a robust protocol, in accordance with the present invention.
Figure 2:
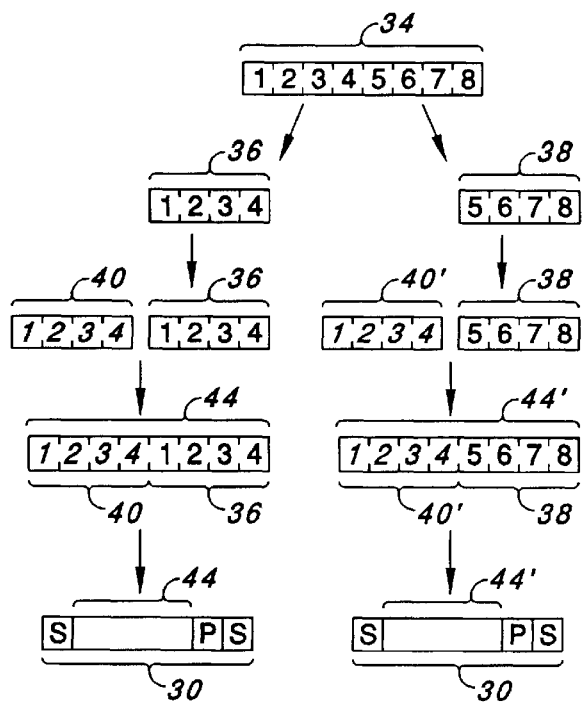
FIG. 2 is schematic representation of the data structure of transmission bytes formed in accordance with the transmission protocol of the present invention.

As shown in the exemplary drawings, and particularly in FIGS. 1 and 2, the present invention is embodied in an asynchronous communication system 10 using a byte sequencing protocol. The protocol allows for successful data transmission over a wireless channel 12 that is subject to adverse conditions such as Rayleigh fading and low-signal strength conditions. The protocol takes into account byte insertions and/or deletions, and other errors in the data, allowing a reasonable packet throughput in adverse conditions.

The communication systems 10 includes a base station 14 and a mobile station 16, such as an automobile or mobile cellular telephone. The base station typically includes a personal computer 18 and a modem 20. The modem 20 is connected through a publicly switched telephone network (PSTN) 21 to a cellular station having a FM transceiver 22. The mobile station 16 similarly includes a processor 24, an external modem 26, and a mobile digital FM transceiver 28. The two modems communicate asynchronously using 300 baud FSK.

In a typical application, the mobile station 16 is an automotive vehicle having a cellular telephone 28 that is integrated with a processor 24 in the vehicle, providing combined data and voice service. The data is transmitted over the 300 baud modem in data packets 30 (FIG. 2). The protocol treats every data packet independently. Thus, the data packets can be sent between voice data bursts. The minimum size for transmission of each data packet burst is a start bit, 7 or 8 data bits, perhaps a parity bit, and a stop bit.

Typical information sent in the data packets 30 include the vehicle's location, requests for diagnostic vehicle information and responses to the requests. The ability to respond with diagnostic information is advantageous because it enables a remote service center 14 to communicate with a vehicle 16 through the vehicles on-board computer 24.

The protocol of the present invention uses processing gain to improve the system's data throughput. The improved throughput allows the system 10 to work in a location near the edge of a cellular telephone cell, in a poor-signal level area and in extreme fading conditions. Under these conditions, service normally would not be available because the probability of getting a complete data frame through the channel without errors is very poor.

In existing systems, the data frames are configured using specific predetermined characters that include a data frame's beginning and its end. These specific characters are generally referred to as the start-of-frame (SOF) byte and the end-of-frame (EOF) byte, respectively. The SOF and EOF bytes allow identification of and, if possible, correction of discrete segments of transmitted data. However, an error occurring in the start bit of either the start-of-frame (SOF) byte or the end-of-frame (EOF) byte will result in an error which may result in complete loss of the data frame if the data frame's boundaries cannot be otherwise determined. Further, the data bit patterns associated with the SOF and EOF bytes either cannot be transmitted in a data frame or can only be transmitted using special procedures.

Data frames can be accommodated in the present invention without the use of SOF and EOF bytes. This is advantageous because the SOF and EOF bytes each have a discrete bit pattern, which increases the packet overhead for transmitting data because the characters associated with these bytes generally can not be used in the data packets. Often byte stuffing is required to allow transmission of the characters associated with the SOF and EOF bytes.

Figure 3:
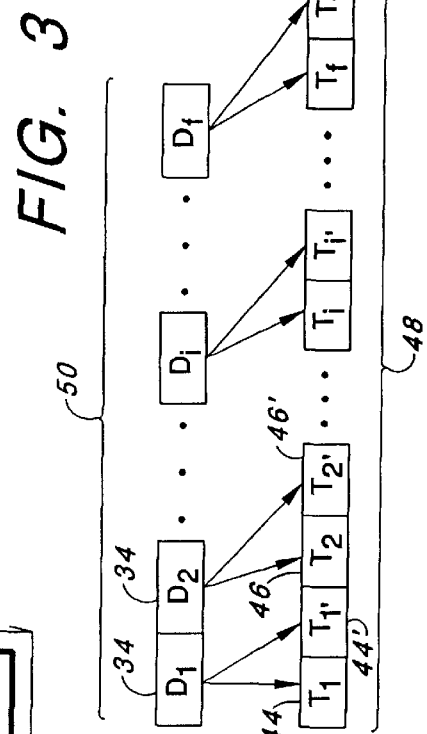
FIG. 3 is a schematic representation of the relationship between data bytes in a data frame and transmission bytes in a data block.

As shown in FIGS. 2 and 3, a communication system 10 using the protocol of the present invention splits a typically eight-bit data byte 34 into two data nibbles 36 and 38. Each data nibble has four bits. Each data nibble is then combined with a four-bit sequence number 40 and 40', respectively, to form two transmission bytes 44 and 44'. Thus, a data byte 34 becomes two transmission bytes with each transmission byte also including a four-bit data nibble sequence number. The sequence number identifies the data nibble's location in a data block 48. A data block is about twice as large as an original data frame 50. The modem combines each transmission byte with the start, parity and stop bits to form a data packet 30 for communication across the rf channel 12.

Because each transmission byte 44 is identified by a unique sequence number 40, associated with the transmission byte's position in the data block 48. The first transmission byte $T_1$ of the data block can be determined by reading the sequence number 40 of a transmission byte $T_i$, and counting back to the first transmission byte $T_1$. The first transmission byte $T_1$ has the number sequence number zero, and if the sequence numbers in the data stream are 2, 3, 4, etc., then the location of the first or start byte (zero) can be found. This allows determination of the first transmission byte, even though the first byte is missing or contains an error.

The data block 48 is repetitively transmitted until a acknowledgement message is received from the receiver or mobile station 10. The end or last transmission byte $T_f'$ of the data block is determined by identifying the transmission byte 44 having the sequence number 40 of zero, indicating the first transmission byte of the next data block, and by taking the transmission byte $T_f'$ that is one byte before the first transmission byte of the next data block.

In the protocol of the present invention, it is not required to "lock on" to a pattern of an absolute sequence of sequence numbers 40. For example, in a severe environment, it may be impossible to get five consecutive transmission bytes 44 through the rf channel 12 without any errors occurring during the five bytes. However, it may be possible to successfully receive some of the transmission bytes and effectively "lock on" to the sequence numbers and identify the first transmission byte $T_1$. For example, a correlation factor can be used to look for incrementing sequence numbers. The correlation factor is computed based on the amount of incrementing required between a particular sequence number and consecutive sequence numbers. More specifically, the correlation factor is calculated using the following equations: $x(n-4)+4=x(n)$, $x(n-3)+3=x(n)$, $x(n-2)+2=x(n)$, and $x(n-1)+1=x(n)$, where n is the current sequence number and $x(n)$ is the value at the sequence number n and, if no errors occurred during transmission, is equal to n. If three of the four equations are satisfied, then the sequence is said to be acquired or "locked on" and the start of the sequence is computed back to the first byte based on the sequence number. For example, if n=5, then the start of the block must be 5 bytes back.

The determination of specific transmission byte 44 insertions and deletions is done by looking at the sequence numbers 40. For example, if the sequence numbers are 0, 1, 2, 4, 5, 6, then the transmission byte associated with the sequence number 3 is missing and a dummy byte needs to be inserted into the data block 48. the dummy byte is corrected by a subsequent data frame transmission. If the sequence numbers are 0, 1, 2, 7, 3, 4, 5, 6, then the transmission byte associated with the sequence number of 7 is an insertion, and needs to be removed.

The robustness of the receiver 14 is related to the number of comparisons that are made for transmission byte insertions and deletions. For example, let $x(n)$ be the sequence number 40 at time n. If the sequence number equation $x(n-1)+2=x(n)$ is true, then there is a byte deletion. If $x(n-1)+1=x(n+1)$ is true, then there is a byte insertion. The n-1 and n+1 depth may be expanded to another level to check for n-2 and n+2. Further levels can be checked depending on the maximum number of byte insertions and deletions that are expected to be detected.

Figure 4:
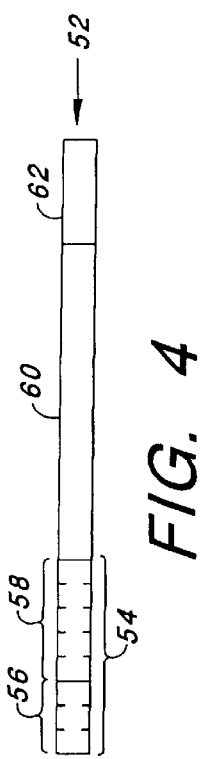
FIG. 4 is a schematic representation of a data frame particularly suited for use with the protocol of the present invention.

Additional features of the present invention are described with reference to a representative data frame 52, shown in FIG. 4. The frame's first data byte 54 contains a frame identification number 56 (3 bits) and a message data length 58 (5 bits). The message data length 58 represents the number of message data bytes 60 in the frame. A message having data length of zero is an acknowledgement message. All other messages have a data length from one to twenty-nine data bytes. The last two frame bytes 62 are associated with a sixteen-bit cyclic redundancy check (CRC) error correlation code. The first data byte 54, the message data bytes 60, and the CRC bytes 62 form the data bytes 34 that are split into data nibbles 36 and assigned sequence numbers 40.

On the receiving end 16, an opposite process takes place. After a data frame 52 is received (sequence numbers removed, etc.), a CRC check is performed on the data bytes 34. If the CRC check passes, then the mobile station 16 sends an acknowledgement message to the base station 14. If the CRC check fails, then mobile station's processor 24 saves the frame for majority voting with the data bytes from subsequent transmission attempts of the data frame. After removal of identifiable transmission byte insertions and detections, based on the sequence numbers 40, the data bytes are, if necessary, majority voted with the previously received data bytes having like sequence numbers. The sequence numbers are not included in the majority voting process. Only the frame data is included in the majority voting process.

Because the data blocks 48 are repetitively transmitted until a acknowledgement is sent by the mobile station 16, each successive transmission of a particular data block results an increased probability that a given transmission byte 44 will be successfully received. The successfully received transmission bytes are identified by their sequence numbers 40 and a majority vote is taken to resolve conflicts or pattern errors. Note that repetitively transmitting the data blocks back-to-back also tends to reduce byte insertions. The majority voting process allows for correction of random bit errors in each data byte 34 without any additional overhead through the communication channel 12. The majority vote can be performed on a byte-by-byte basis or, depending upon the available processing power, can also be preformed on a bit-by-bit basis. Alternatively, it is possible to perform a majority vote at the byte level and, if a majority does not exist at the byte level, then to perform a majority vote at the bit level. Also, a likelihood check may be performed instead of a majority vote or after an ambiguous vote. For example, if two bytes of a total of five bytes from five data frames match, although not a majority, it is likely that the two bytes represent the correct byte.

The protocol and algorithms of the present invention have many processing variations. It can be as thorough or as minimal as required, given available processing power. The search for bit insertions and deletions can account for as many insertions and/or deletions as expected on the channel 12. The additional processing time to look for sequential data insertion or deletion errors requires additional byte-by-byte testing of the received data.

Although a four-bit sequence number 40 would normally uniquely identify the position of only sixteen transmission bytes 44, sequence numbers can be effectively reused in a unique pattern that still identifies the first byte of the block. A unique the sequence number pattern that allows sequence number revise is as follows:
0,1,2,3,4,5,6,7,8,9,A,B,C,D,E,F,0,3,6,9,C,F,2,5,8,B,E,1,4,7, A,D,0,5,A,E,4,9, . . . 0,7,E,5,C, . . .

These sequence numbers are generated by the following algorithm:

```
for i=0 upto 15
   seq_table[i] = i
endfor
seq = 0
for i = 16 upto 31
   seq_table[i] = seq
   seq = (seq + 3) & 0xF
endfor
seq = 0
for i=32 upto 47
   seq_table[i] = seq
   seq_(seq + 5) & 0xF
endfor
seq = 0
for i=48 upto 63
   seq_table[i] = seq
   seq = (seq + 7) & 0xF
endfor
```

The only sequence numbers 40 used are those that are required to transmit a given message length. A new data block 48 always starts with the sequence number pattern 0,1,2,3 . . . , because this sequence number pattern indicates a new "frame" of data is being transmitted. The unique sequence number pattern is used to determine the particular location of a data nibble 36 in the data block 48. For example, if the sequence numbers regularly jump in increments of the three, and the sequence number is 9, then the transmission byte 44 is the twentieth byte in the data block. Therefore, even though there are only 4 sequence number bits which would normally yield only 16 combinations, unique incremental spacings between sequence positions yields a large number of possible sequence numbers for a data block. Under harsh conditions, the correlation factor is generally successful in identifying the sequence number pattern, and hence the first transmission byte 44, within the first 16 bytes, which have consecutive sequence numbers.

Figure 5:
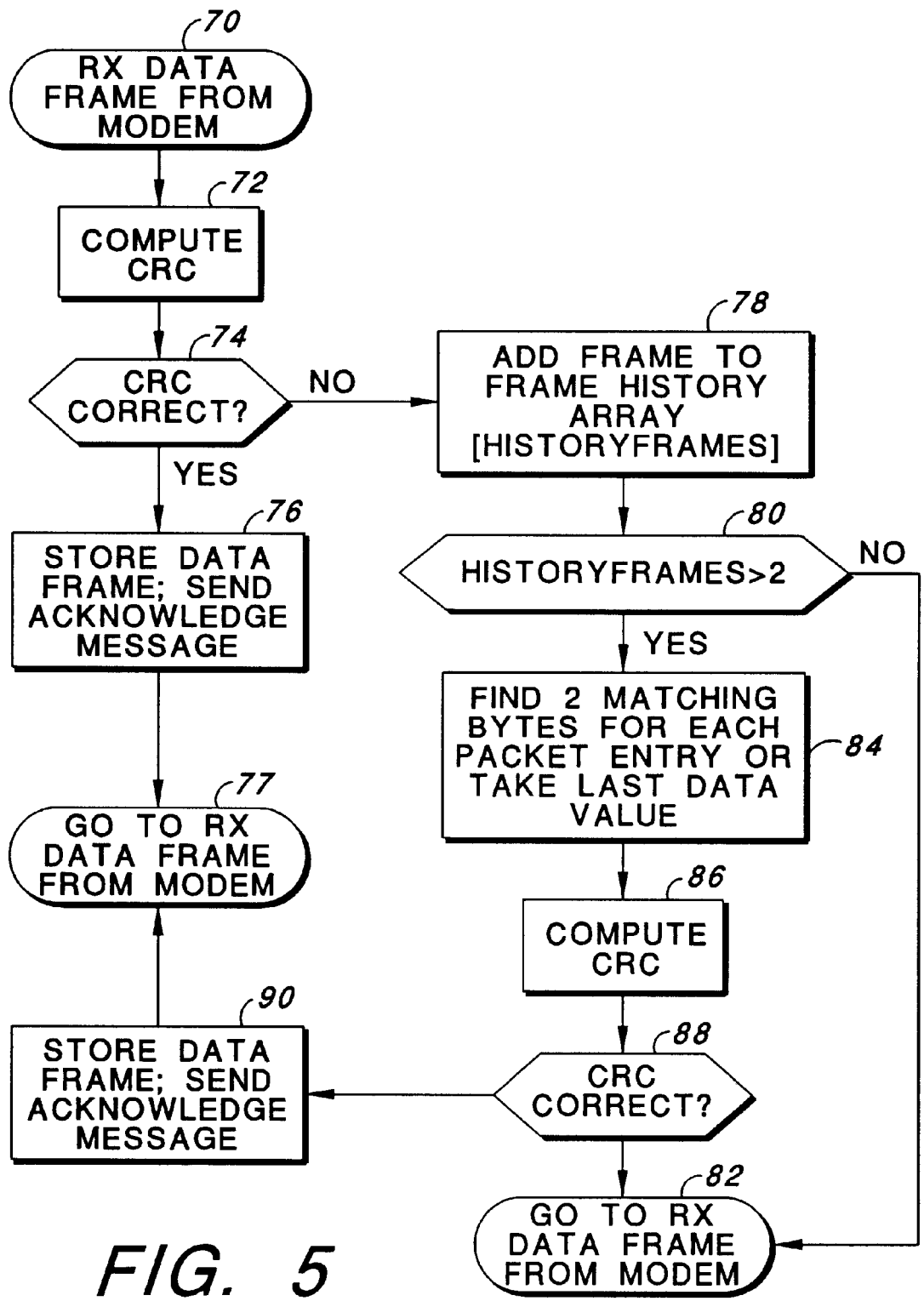
FIG. 5 is a flow chart of a majority vote algorithm, in accordance with the present invention.

As shown in FIG. 5, the majority vote algorithm uses available data received from successive data block 48 transmissions to complete a data frame 60. In the first step (Block 70), the receive (RX) processor 24 attempts to assemble the original data frame 60 from a received data block. The processor performs a CRC check using the frame's 16-bit CRC bytes 62 (Block 78). If the CRC check and the frame's CRC bytes match (Block 74), then the data frame 60 is complete and an acknowledge message is sent to the host computer (Block 76) and a subsequent data frame is received (Block 77). If the CRC check fails to result in a match, the data frame is added to a frame history data array (Block 78). If there are not yet at least two history data frames in the array (Block 80), then another data frame is received and a CRC check is performed on that frame (Blocks 82, 70, and 76). If the CRC check results in a match, then an acknowledge message is sent (Block 76). If the check fails to result in a match, then the data frame is added to the frame history array until at least three frame histories are collected (Block 80). After three frames are collected, a majority vote is taken between matching data bytes 34 of the collected data frames (Block 84). If only two data bytes for a particular frame location have been received when a majority vote is taken, then the last available data byte is selected. After the majority vote, a CRC check is again computed (Block 86). If the check results in a match (Block 88), then an acknowledgement message is sent (Block 90). Otherwise, another data frame is collected (block 82).

Figure 6:
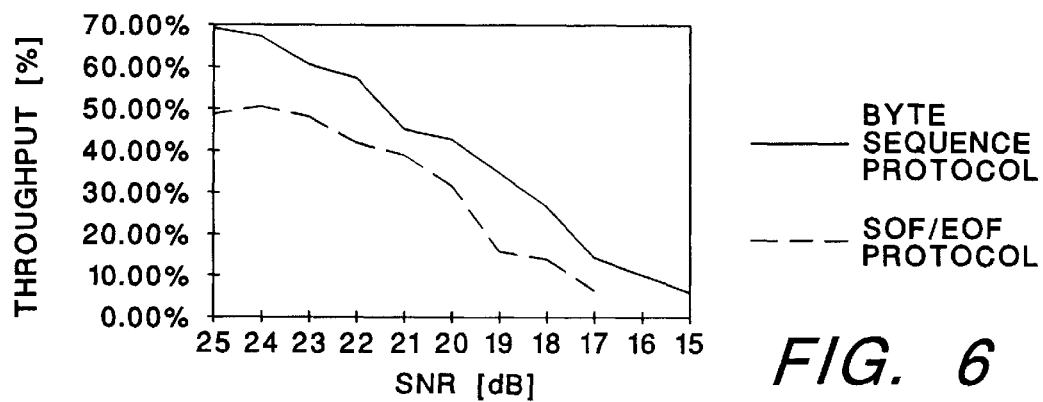
FIG. 6 is a graph comparing the performance of the communication system of FIG. 1, when using the byte sequence protocol of the present invention, as compared with the system using the start frame/end of frame protocol.

Thus, the protocol of the present invention exploits a majority of the correctly received data bytes 34 in a data frame 60 containing errors. As shown in FIG. 6, the performance of a system using the protocol of the present invention at a given throughput, is equivalent to a signal-to-a noise ratio (SNR) improvement of about 1.5 to 2.5 dB better than the performance of data frames using SOF and EOF characters. FIG. 6 illustrates a comparison between the two protocols under simulated Raleigh Fading conditions and channel noise (modeling the conditions associated with 20 miles per hour relative motion between the base station 14 and the mobile station 16 and gentle noise). The system's performance depends on the frame length, and improves for shorter frames. This improvement in performance is significant in the signal strength threshold region (17–18db SNR) of an FM wireless carrier where a standard protocol is generally unable to pass any complete frames through the rf channel without errors. With the protocol of the present invention, the communication system 10 can deliver a data frame 60 with 95% probability of error-free reception, and with a system time out of less than one minute.

Figure 7:
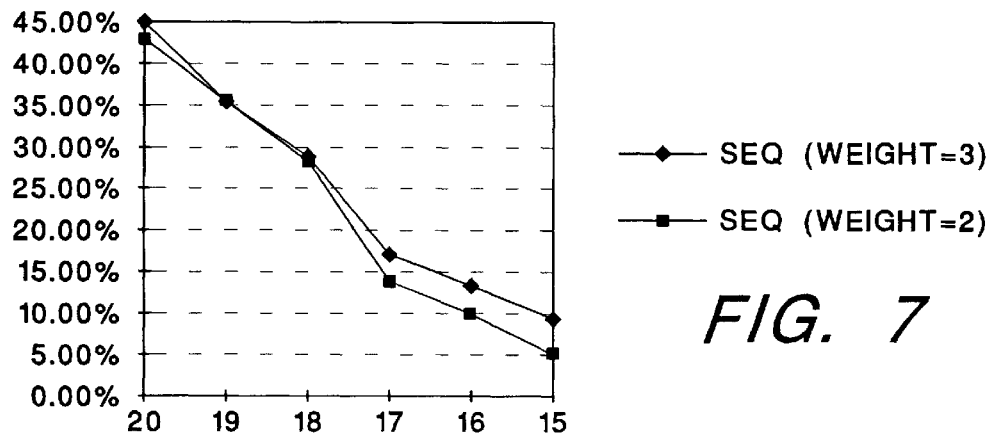
FIG. 7 is a graph comparing throughput (in percent) to signal-to-noise ratio, for a three-four voting scheme versus a two-four voting scheme.

As shown in FIG. 7, a figure for the recommended number of correctly identified byte sequence numbers before having a "locked" data pattern is three bytes out of four bytes (3/4). Under low signal-to-noise (SNR) conditions, a larger number of false detections occur and, therefore, improved performance is obtained by using a 3/4 scheme, rather than a 2/4 scheme.

There are various existing protocols for wireless channel data communications, but the existing protocols are based on synchronous communication formats in which byte insertions and/or deletions are not possible. Also, synchronous data transmission protocols generally have special start-of-frame (SOF) and end-of-frame (EOF) characters which are required to delineate a frame of data. The protocol of the present invention does not require any special SOF or EOF characters. The protocol of the present invention features a nibble sequence number, a 16 bit CRC, an algorithm for determining byte insertions and deletions, improved start and end of data frame detection, and requires no byte stuffing.

While the invention herein disclosed has been described by means of specific embodiments and applications thereof, numerous modifications and variations could be made thereto by those skilled in the art without departing from the scope of the invention set forth in the claims.

What is claimed is:

1. Apparatus for communicating data bytes between a first station and a second station through an rf data channel subject to conditions that can cause byte insertions and deletions, comprising:

a first processor, associated with the first station, having at least one data byte for transmission, wherein the first processor divides the data bytes into at least two data nibbles, assigns a unique sequence number to each data nibble, and combines each data nibble with the respective sequence number to form a transmission byte, each data byte being split between at least two transmission bytes;

a first rf modem, associated with the first station, that receives the transmission bytes from the first processor and transmits the transmission bytes through the rf data channel;

a second rf modem, associated with the second station, that receives the transmission bytes from the rf data channel; and a second processor, associated with the second station, that receives the transmission bytes from the second rf modem and that, using the sequence numbers, identifies and removes byte insertions and accounts for byte deletions, wherein the second processor reconstructs, if the respective transmission bytes are successfully received, a data byte from the successfully received transmission bytes.

2. Apparatus for communicating through an rf data channel as defined in claim 1, wherein the first processor structures the data bytes into at least one data frame, each data frame having a control byte, message bytes, and one or more check bytes.

3. Apparatus for communicating through an rf data channel as defined in claim 2, wherein:

the second processor performs a CRC check on the received data frame using the check bytes and generates an acknowledgement message for transmission to the first processor if the CRC check results in a match with the check bytes;

the second modem transmits the acknowledgement message through the rf channel to the first modem; and the first processor receives the acknowledgement message from the first modem.

4. Apparatus for communicating through an rf data channel as defined in claim 3, wherein the first station repeats transmission of the data frame if the first station fails to receive an acknowledgement message from the second station.

5. Apparatus for communicating through an rf data channel as defined in claim 4, wherein the second processor, after reconstructing data bytes for at least three different transmissions of a given data frame for which a CRC check, after each data frame transmission, has failed to result in a match, performs a byte-by-byte likelihood check using the reconstructed data frames to form a plausible data frame and repeats the likelihood check, including data bytes from subsequently transmitted data frames, until the CRC check of the plausible data frame results in a match and an acknowledgement message is sent to the first station.

6. Apparatus for communicating through an rf data channel as defined in claim 5, wherein the second processor performs the likelihood check by performing a byte-by-byte majority vote.

7. Apparatus for communicating through an rf data channel as defined in claim 5, wherein: the second processor further performs a bit-by-bit majority vote on the reconstructed data frames before performing the byte-by-byte likelihood check.

8. Apparatus for communicating through an rf data channel as defined in claim 2, wherein the first processor calculates a correlation factor on the sequence numbers to identify the first byte of a data frame.

9. Apparatus for communicating through an rf data channel as defined in claim 2, wherein:

the control byte includes 3 bits defining a frame identification number and 5 bits defining, in bytes, a message length; and the check bytes are a 16-bit cyclic redundancy code (CRC) sum.

10. Apparatus for communicating through an rf data channel as defined in claim 9, wherein the acknowledgement message has a message length of zero.

11. A method for communicating a data frame formed of at least one data communication byte through a noisy data channel, comprising:

dividing the data bytes into 2 or more data nibbles;

combining each data nibble with a sequence nibble to form a transmission byte;

transmitting the transmission byte across the data channel;

receiving the transmission byte and identifying the sequence nibble to locate the beginning of the data frame;

combining the appropriate data nibbles from successive transmission bytes to reconstruct the original data byte.

* * * * *